United States Patent [19]

Davis et al.

[11] Patent Number: 4,646,306

[45] Date of Patent: Feb. 24, 1987

[54] HIGH-SPEED PARITY CHECK CIRCUIT

[75] Inventors: Harold L. Davis, The Colony; Douglas P. Sheppard, Grapevine, both of Tex.

[73] Assignee: Thomson Components - Mostek Corporation, Carrollton, Tex.

[21] Appl. No.: 686,331

[22] Filed: Dec. 26, 1984

[51] Int. Cl.$^4$ .............................................. G06F 11/10
[52] U.S. Cl. ...................................... 371/49; 307/471; 307/530
[58] Field of Search .......................... 371/49; 364/738; 307/471, 268, 530

[56] References Cited

U.S. PATENT DOCUMENTS

| | | | |
|---|---|---|---|
| 3,560,765 | 2/1971 | Kubinec | 307/530 X |
| 4,049,974 | 9/1977 | Boone | 371/49 X |
| 4,208,730 | 6/1980 | Dingwall | 307/530 X |
| 4,250,410 | 2/1981 | Moench | 307/268 X |
| 4,450,371 | 5/1984 | Bismarck | 307/268 X |
| 4,450,562 | 5/1984 | Wacyk | 371/49 X |
| 4,477,904 | 10/1984 | Thorsrud | 371/49 |

*Primary Examiner*—Jerry Smith
*Assistant Examiner*—Robert W. Beausoliel, Jr.
*Attorney, Agent, or Firm*—Roland Plottel

[57] ABSTRACT

A high speed parity circuit uses a sequence of simplified exclusive-OR circuits responsive to data input terminals containing a data signal and its complement and terminating in a sense amplifier, together with an operating sequence in which the inputs to the sequence are grounded while the data lines are first brought high and then set to the correct data state to form a pair of separate paths through the sequence when no current flows, after which set-up operation an input voltage circuit raises the voltage on one of the paths smoothly, so that the sense amplifier can respond as soon as its input is large enough, without waiting for a settling time.

5 Claims, 3 Drawing Figures

HIGH-SPEED PARITY CHECK CIRCUIT

TECHNICAL FIELD

The field of the invention is that of integrated circuits, in particular circuits that check the parity of a combination of signals.

BACKGROUND ART

It is known in the art to use exclusive-OR circuits to perform parity checks. A drawback of prior art use of such circuits is that the prior art circuits have required a long settling time before the output signals have stabilized. It has therefore not been possible to achieve high-speed parity check operation in the prior art.

SUMMARY OF THE INVENTION

The invention relates to a parity checking circuit including a set of path-inversion (or exclusive OR) circuits followed by a sense amplifier. The circuit also includes timing circuits to set the initial state of the exclusive OR circuits; to set up the data to be checked in its correct value; to then apply a voltage to the input of the exclusive OR circuits and then, after a delay, to sense the state of the output voltage.

A feature of the invention is the sequence of an initial state of grounded inputs of the exclusive-OR circuits during the data setup period, followed by the rise in voltage of one of the inputs to produce a smoothly-changing output.

Another feature of the invention is the use of a sense amplifier to provide for small-signal sensing of the output and fast response.

Another feature of the invention is the ability to cascade a relatively large number of exclusive OR circuits in the series.

BEST MODE OF CARRYING OUT THE INVENTION

Figure 1:
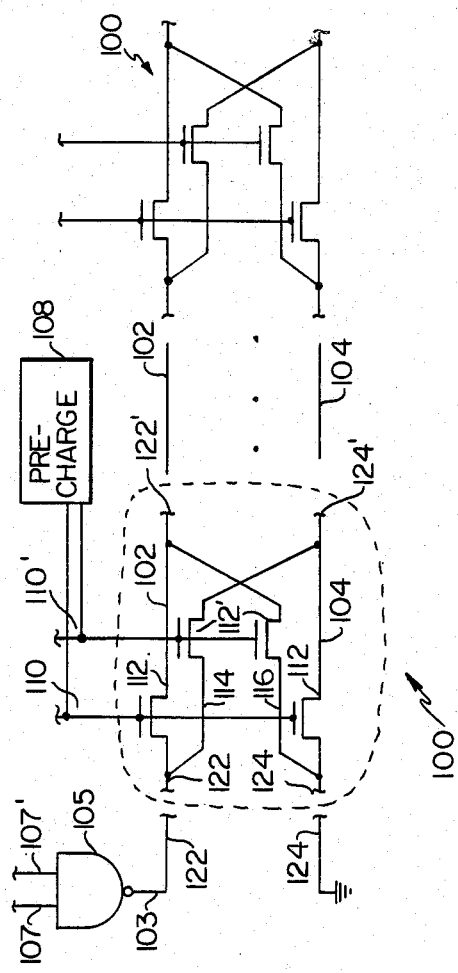
FIG. 1 illustrates an exclusive-OR circuit and an input circuit according to the invention.

Referring now to FIG. 1, there are shown two exclusive-OR circuits 100, the first of which is indicated by a dotted line, out of a set of N series-connected circuits. Each exclusive-OR circuit 100 has a pair of data input lines 110 and 110' respectively for the complement and true data signals. Each circuit 100 comprises two pairs of transistors 112 and 112' connected in a fashion similar to that of a polarity-reversal switch in that the inputs 122 and 124 of circuit 100 will be connected either to corresponding outputs 122' and 124' or will be inverted so that input 122 is connected to output 124' and vice versa. After the circuit is stable, a signal voltage on input 122, say, will travel along either upper line 102 or lower line 104, switching from line 102 to line 104 if data line 110 is low and data line 110' is high. The output signal pattern on the final set of output terminals 122' and 124' will be the same as the input signal pattern on the first of terminals 122 and 124 or the complement of that pattern depending on whether there is an even or odd number of true states of data signals within the set of signals being checked. For purposes of this application, a circuit 100 connected in this fashion will be referred to as a path-inversion circuit and the sequence of connectors along lines 102 and 104 respectively will be referred to as the upper and lower rails. Circuit 100 is a simplified exclusive-OR circuit in that the output is not defined when both inputs are low. This is not a problem, since the inputs 110 and 110' are the complement of one another.

The circuit operates in association with a time sequence in which first all lines 110 and 110' are precharged to VCC by precharge means 108, indicated schematically. Circuit 108 may be any conventional circuit for accomplishing the function, such as a set of pull up transistors connected to each data line or a gated circuit that applies the voltage to the lines at the appropriate time. Also, at the start of the cycle, both terminals 122 and 124, connected to lines 102 and 104 respectively, are at ground, thus setting up a situation in which all transistors 112 and 112' are turned on but are not carrying current because both the inputs are at ground. By means of this initializing procedure, this circuit avoids the problems found in prior art circuits: that the transistors switch relatively large amounts of current as the data is set up to its correct value; and that the transients produced in the circuit state cannot be detected until the output is stable, of course.

In the set up stage, data lines 110 and 110' are set to the correct value of the data being tested; i.e. one of each pair of lines 110 is brought low to ground and the other remains high. This is accomplished by conventional latching dynamic sense amp means that are not part of the present invention and are not shown in the figure. When the data is correctly set up, there is a continuous and separate path from each input terminal 122 and 124 all the way through the set of circuits 100 to the final output terminals 122' and 124'. This path will switch back and forth from the upper rail 102 to the lower rail 104 depending on the state of the data in the corresponding set of lines 110. Only after the data lines 110 and 110' are stable, does NAND gate 105 raise the voltage on one of input terminals 122' and 124', conventionally 122'. As the signal on terminal 122' starts to rise, current will start to flow through the path between input 122 of the first of circuits 100 and whichever output (122' or 124') of the last circuit 100 in the chain is connected to it.

Effectively, there is a large capacitor formed by the lengthy interconnection network that has to be charged up. It is an advantage of this invention that the charging process for that data path is smoothly varying as a function of time, so that it is not necessary to wait until the voltage on the output terminal reaches its final stable value. The state of the output terminals can be sensed as soon as the voltage is large enough to avoid an incorrect reading from noise and to allow an early determination of that state.

The circuit shown is self-timed in that one of the set of lines 110 and 110' of a circuit 100 (the slowest set of lines to respond) is connected to inputs 107 and 107' of NAND gate 105 feeding in on line 103 to input terminal 122. In the case of a memory circuit, the slowest pair of lines to respond will be the one that is connected to a data element that is farthest away from the parity checking circuit. NAND gate 105 has an output that is at ground during the precharge period and responds to the transition of one of lines 110 and 110' dropping to ground to generate a high voltage that initiates the turn-on process within circuit 100. A fixed time delay could also be used.

Figure 2:
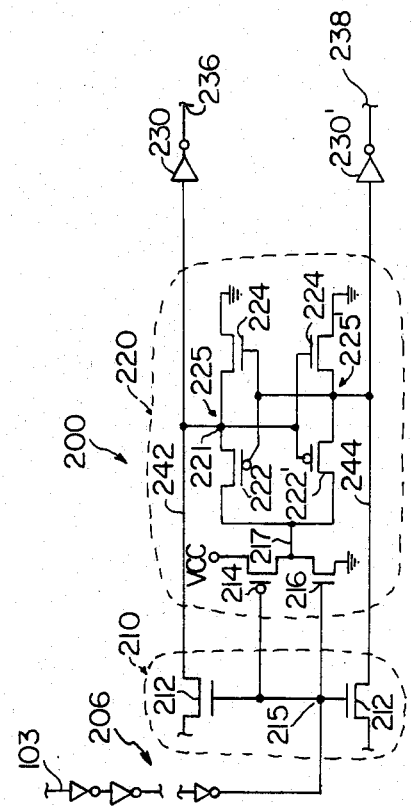
FIG. 2 illustrates an output circuit according to the invention.

It is an advantageous feature of this invention, referred to above, that the state of the output terminals can be sensed as soon as the rising voltage is above some nominal value that is set to provide a noise margin. A suitable circuit for this function is a sense amplifier, indicated as circuit 200 in FIG. 2. Circuit 200 is divided into three parts: an input circuit, or isolation circuit, 210 that serves to isolate the sense amplifier from the chain of exclusive OR circuits 100; the sense amplifier itself, 220; and a pair of output circuits, 230 and 230'. Nodes 242, 244, and 217 are precharged to ground. In operation, as the voltage on one of terminals 122' or 124' starts to rise, the voltage on one of rails 242 and 244 will also start to rise because pass transistors 212 and 212' are held on by a positive voltage on node 215, which is controlled by timing circuit 206. The rise of rails 242 and 244 will be relatively slow because they are connected to the large capacitance that is represented by the long conductive path through the chain of exclusive-OR circuits 100. After sufficient time has passed so that there is a sufficiently large voltage difference between rails 242 and 244, for sensing the magnitude of that difference being dependent of course on a multitude of variables, the last inverter in timing circuit 206 will switch states so that node 215 goes to ground, forcing transistors 216, 212, and 212' off and transistor 214 on. Timing circuit 206 is simply an inverter chain responsive to the output of NAND gate 105.

There is thus a path from the VCC node at the drain of transistor 214 through node 217 on to the coupled inverters 225 and 225' that make up the remainder of sense amplifier 220. If, for example, node 242 is rising in voltage, then node 221 will rise also, affecting transistors 222' and 224'. Transistor 224' will start to turn on and transistor 222' will start to turn off. Thus, current from the VCC node connected to transistor 214 will flow preferentially through transistor 222 and onto node 221 connected to rail 242. This current path and associated transistors will be referred to as a driving means, since it drives nodes 242 and 244 apart in voltage. At the same time, pass transistors 212 and 212' have turned off, so that node 242 is isolated from the rest of the long conductive path and has a relatively small capacitance. It will thus be possible to raise the voltage on node 242 (and 221) more rapidly than would be the case if sense amplifier 200 were not isolated. With this advantage, node 217 will rapidly rise to the voltage level VCC, stabilizing the output value of sense amplifier 220 rapidly. The rapid rise in voltage to a stable value is an important advantage of this invention that results from the use of a rapidly settling voltage level together with a sense amplifier. Output inverter 230 will respond to the rising value of the voltage on node 242 to produce a stable ground value output on output node 236. Output inverter 230' will respond to the unchanged ground value on node 244 to maintain an unchanged high value on node 238.

Figure 3:
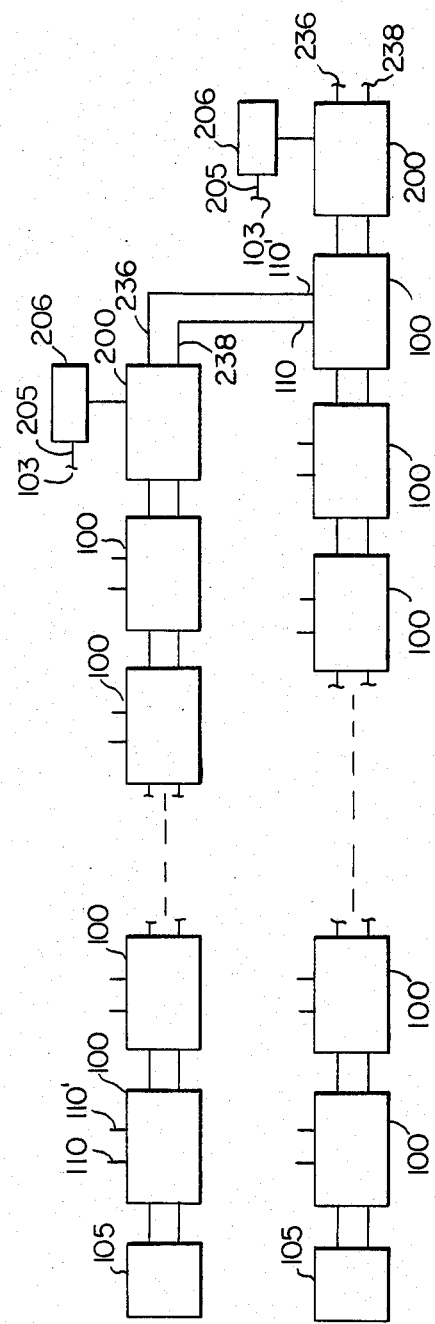
FIG. 3 illustrates a combined system according to the invention.

Referring now to FIG. 3, there is shown a more complicated parity checking circuit comprising two sets of circuits 100. Each chain of circuits has a trigger NAND gate 105, as shown in FIG. 1. The upper chain of circuits terminates in an output sense amplifier 200, triggered by timing circuit 206 having input line 205 coming from NAND gate 105 or any other convenient reference. The output of the upper circuit 200 serves as input to an additional exclusive-OR circuit 100' that effectively combines the lower chain and the upper chain to form a final output in the last circuit 200. Those skilled in the art will readily be able to devise many combinations of chains of circuits 100 and circuits 200 to form any desired parity checking function. Here, the output terminals of a chain of circuits 100 reproduce the input pattern if there is an even number of true data states.

Additional inverters may be added on lines 102 and 104 in order to provide for the opposite parity convention.

We claim:

1. A parity-forming integrated circuit for placing an output voltage on at least one output terminal (122',124') in response to an input voltage (103) passing along a data-dependent path (102,104; 114,116) to said output terminal;

in which a cascaded plurality of path-inversion circuits (100) are provided, each of which has
a pair of upper (122) and lower (124) input terminals,
a pair of data terminals (110,110'), and
a pair of upper (122') and lower (124') output terminals connected to said input terminals (122,124) along a selected one of two separate alternative paths, said selected alternative path depending on a data state applied to said data terminals (110,110');

whereby a first upper voltage input terminal (103,122) in a first of said cascaded plurality of path-inversion circuits is connected by a data-dependent path (102,104; 114,116) to one of a pair of last upper and lower output terminals (122',124');

in which said input voltage is controlled, after signals on all the data lines (110,110') of said plurality of path-inversion circuits (100) are stable, from an initial ground state value to a non-zero value and applied to said first voltage input terminal (103) by voltage input and timing means (105); and in which said pair of last upper and lower output terminals is connected to an output sense amplifier (200) for amplifying a signal on said pair of last upper and lower output terminals to produce an output signal (236,238) in a data state dependent on said data-dependent path (102,104; 114,116).

2. A circuit according to claim 1, in which said path-inversion circuits (100) include means for establishing
a first state of a low-impedance connection (112) between said upper input and upper output terminals and between said low input and lower output terminals
and a second state of a low-impedance connection (112') between said upper input and lower output terminals and between said lower input and upper output terminals.

3. A circuit according to claim 2, further including input means for applying a low-impedance path to ground to both of said upper and lower input terminals of a first one of said plurality of path-inversion circuits during a data set-up period in which said data state is established on said data terminals;
and for then applying a selected voltage to one of said upper and lower input terminals of said first one of said plurality of path-inversion circuits in response to an initiating signal, whereby said plurality of path inversion circuits form two separate, continuous paths from said upper input terminal to one of said pair of last output terminals and from said lower input terminal to the other of said pair of last output terminals before said input means applies said selected voltage to said one of said upper and lower input terminals.

4. A circuit according to claim 3, in which
said sense amplifier (200) responds initially to a changing voltage on one of said pair of last upper and lower output terminals (122',124') to form a voltage difference between first (221,242) and second (244) intermediate nodes; and in which
isolation means (210), in response to a timing signal on a latch node (215), form a high-impedance barrier (212,212') between said pair of last upper and lower output terminals (122',124') and corresponding ones of said intermediate nodes (242,244), while driving means (214,216,222,221), controlled by said timing signal on said latch node (215), drive said intermediate nodes rapidly to magnify said voltage difference.

5. A circuit according to claim 1, in which said plurality of path-inversion circuits are connected in at least two cascaded sequences, each terminating in a sense amplifier having a pair of sense amplifier output terminals;
and in which a first pair of sense amplifier output terminals of said at least two sequences are connected to said data terminals of a selected one of said path-inversion circuits of a second cascaded sequence, whereby said sense amplifier of said second cascaded sequence responds to data states on data terminals of both said first and second cascaded sequences.

* * * * *